United States Patent Office 3,544,440
Patented Dec. 1, 1970

3,544,440
PROCESS FOR COATING CONDUCTIVE SUBSTRATES
Jürgen Weigel, Illingen, Germany, assignor to Hamburger Flugzeugbau G.m.b.H., Hamburg, Germany, a corporation of Germany
No Drawing. Continuation-in-part of application Ser. No. 373,970, June 10, 1964. This application Jan. 23, 1969, Ser. No. 793,532
Claims priority, application Germany, June 15, 1963, H 49,471
Int. Cl. B01k 5/02; C23b 13/00
U.S. Cl. 204—181                    10 Claims

ABSTRACT OF THE DISCLOSURE

A method of coating metal substrates with synthetic resins in which the substrate is anodized in an electrophoresis bath containing dispersed synthetic resin particles. An additive is supplied to neutralize cations released from the anode by complexing them or precipitating the cations as slightly soluble salts.

---

This application is a continuation-in-part of my copending application Ser. No. 373,970, filed June 10, 1964, now U.S. Pat. No. 3,424,663.

My present invention relates to a process for coating metallic substrates and other materials with synthetic resins and other organic materials from dispersions thereof by electrophoresis.

In my earlier application identified above, I have pointed out that processes for the electrophoretic precipitation of rubber particles from dispersions thereof onto metallic surfaces had been proposed theretofore. Such processes usually involved suspending the rubber particles in a liquid medium and then immersing an electrode-forming substrate into this medium with the application of an electric current across the substrate and a counterelectrode to draw particles of rubber from this dispersion onto the substrate surface.

Such electrophoretic precipitation of rubber has a significant disadvantage in that the rubber particles possess a low adhesion to the substrate; moreover, the layer formed upon the substrate is electrically insulating and limits the electrophoretic deposition current so that the thickness of the layer is also restricted. For these reasons, therefore, there has been little actual use of electrophoretic techniques in the precipitation of synthetic resins prior to the development described in application Ser. No. 373,970.

It may be further noted that such processes have not found actual application in the production of synthetic resins or bodies coated therewith because the ionic particles discharged into the medium from the substrate or the counterelectrode (generally the former) have an electrical charge of a polarity opposite that normally possessed by the synthetic-resin particles so that the latter are prematurely precipitated by combinations of the two groups of particles with consequent flocculation and do not necessarily deposit upon the substrate.

In accordance with the improvement of the earlier application, the disadvantages of prior techniques were obviated by a process for the electrophoretic deposition of synthetic-resin particles upon a conductive substrate in the presence of ionic particles from this substrate or a counterelectrode, which involves the alteration (i.e. neutralization or, preferably, reversal) of the effective charge of one of these groups of particles so that there is no tendency for the ionic particles to combine with the synthetic-resin particles and produce premature deposition. It was an important aspect of this system that this alteration of the electric charge of one of the group of particles and preferably the ionic particles be effected by chemically tying up these particles with ions of opposite electrical charge, generally by complex formation. To this end, a complex former or complexing agent may be added to the preferably aqueous medium or can be formed in situ therein as described hereinbelow. It is thus possible to impart the identical polarities to the ionic particles and the synthetic-resin particles.

According to my earlier teachings, the synthetic-resin particles are solid particles of one or more high-molecular-weight polymers, e.g. formed by addition, substitution or condensation polymerization, the liquid medium further including conductive particles depositable on the substrate concurrently with the synthetic-resin particles so that the resin layer cannot function as an insulator modifying the electrophoretic current flow. In other words, these conductive particles maintain the electric current flow between the collecting surface of the substrate and the liquid medium or phase. It may be noted that these particles can be the ionic particles mentioned above whose effective electrical charge has been reversed in polarity by complex formation.

Furthermore, the substrate may be composed of a metal which could be anodized concurrently with deposition of the synthetic resin so that an oxide layer is formed on the collecting surface simultaneously with deposition of the synthetic resin. This arrangement is especially advantageous for aluminum substrates; the oxide layer functions in part as a complex former in that it ties up metal ions as noted earlier. Additionally, a more specific feature provided that the synthetic-resin dispersion include particles of a coloring agent or pigment which were deposited as part of the resin layer. It may be noted that, when the substrate is rendered anodic as is usually the case (as a consequence of the generally negative charge carried by the resin particles), anionic dyestuffs may be employed. Cationic dyestuffs were used when the substrate was at a negative charge.

Electrophoretic deposition under that system was effective with most conductive materials such as metals (e.g. iron, iron alloys, zinc, cadmium, nickel, copper and aluminum), graphite, metal oxides and the like. The electrophoretic deposition is carried out by juxtaposing the conductive substrate, constituting a first electrode, with a second or counterelectrode and applying, by means of an external circuit, an electric current together with the addition of complex formers, which can be organic or inorganic depending upon the particular requirements. The process is generally similar to that of electrolysis. The complex formers must be so chosen that they are capable of effecting direct deposition of the synthetic-resin particles upon the conductive substrate. This can be achieved, in general, by insuring that the complex formers can convert the metal ions, entering solution from the substrate or counterelectrode and having a positive charge, into negatively charged particles, thereby preventing these metal ions from prematurely flocculating the negative macromolecules of synthetic resins; the synthetic-resin particles are carried to the conductive substrate without intereference and adhere intimately and tenaciously thereto. As an alternative to this anodic deposition of the synthetic resin, it was noted that it is possible to render the substrate cathodic and provide a dispersion of positive synthetic-resin macromolecules or else employ complex formers which reverse the polarity of the negative macromolecules.

When the substrate or counterelectrode is composed of aluminum or aluminum alloys, the complex former of this prior application was a fluoride such as ammonium fluoride; when copper or zinc constitute the substrate, cyanide complex formers (e.g. cadmium cyanide or potassium cyanide) were employed. For iron and its alloys, EDTA complex formers (e.g. sodium ethylenediaminetetraacetic acid salts) were used. The cathodic or anodic deposition of the dispersed particles was carried out either with pure direct current or with alternating current of higher or lower frequency; it was found to be advantageous to use a pulsating direct current with a characteristic pulse frequency. The electrophoresis voltage can, according to this invention, range between 0.5 and 100 volts with a current density between 0.01 and 25 A./dm.$^2$. It has been found that the higher current densities result in denser layers so that selection of the current density makes possible a control over the structure of the layer.

The layer forms with a generally cellular or porous structure so that, at the conclusion of the process, at least the surface of the layer is partly formed with open cells. To close these cells or to fill them, the system subjected the layer to a further deposition of synthetic resin or a heat treatment subsequent to the electrophoretic process. The after-treatment can, therefore, be of the type generally referred to as Eloxing whereby the layer is immersed in a dispersion of synthetic-resin particles which deposit from the liquid medium onto the layer; this technique results in a partial or complete filling of the cellular structure. Alternatively or in addition, it is generally desirable to subject the layer to a heat treatment at a temperature above the softening point of the thermoplastic synthetic resin but not greater than about 200° C. The heat treatment can be provided before or after the last resin deposition step. The color pigment can, if desired, also be added during the subsequent deposition.

The coating of objects with synthetic resin was for a variety of purposes. Thus it is frequently desirable that the synthetic-resin layer constitutes a corrosion-resistant, flexible and wear-resistant layer. The frictional resistance of the layers produced in accordance with the present invention can be several times greater than that of layers produced by electrolysis. In another use of such layers, the synthetic resin can be employed as a sealing means between interconnected parts. The layers are so tenacious that they are not destroyed even during connection of the parts by rivets, bolts or the like and, when the connecting means is also provided with such coatings, the contacting surfaces of the synthetic-resin layers can be welded together (e.g. heat-sealed) so that a substantially monolithic protective covering is provided. The layers can also serve as bases for adhesives which might otherwise not bond securely to the substrate, the intervention of the synthetic-resin layer markedly improving the shear strength of any adhesive connection formed. Moreover, the present technique can be used for depositing synthetic resin upon wires or cables to serve as insulating sheaths. When this technique is compared with earlier dip-coating and multiple dryings, it is clear that a substantial increase in the rate of production, effectiveness of bonding and simplicity of handling is involved.

It is the principal object of the present invention, therefore, to extend the concepts set forth in my application Ser. No. 373,970 to further improvements in the electrophoretic deposition of particles of conductive substrates.

Another object of the invention is to provide an improved process for the electrophoretic deposition of synthetic resins upon metallic structures constituted as electrodes.

A more specific object of this invention is to provide an improved process for depositing a highly adherent layer of synthetic resin from a dispersion of synthetic resin particles upon a conductive substrate.

As has been noted above, the basic patent application provided a process for the electrophoretic coating of metallic substrate whereby the polarity of the metal ions solubilized at the electrode, which would impede further deposition, is reversed to eliminate flocculation prior to coating of the substrate.

The present improvement is directed to systems involving the neutralization of the charge on the solubilized metal particles as contrasted with polarity reversal, suitable complexing agents or additives being introduced to effect the neutralization.

According to the present invention, therefore, a complex former or complexing agent is added to the electrophoretic bath or is formed in situ therein and is present in such quantity and/or is of such nature that a simple neutralization of the ionic particles released at the electrodes is effected. More specifically, electrophoretic processes of the character with which the present invention is concerned connect the substrate as an anode for coating with synthetic-resin particles in an aqueous electrophoretic bath in which the particles are dispersed. During the electrophoretic process, cations will electrolytically solubilize at the anode and are neutralized by complexing or neutralizing agents. Alternatively, the neutralization of the cations can be electrochemically effected. The two major techniques within the ambit of the present invention are the formation upon release of the cations at the anode of compounds of low solubility such that the cations are precipitates from the dispersion, the complexing of the cations with water soluble complexing agents such that the complexes remain in solution but are uncharged and thus incapable of interfering with further coating of the substrate. The complexes or compounds are electrically neutral.

I have found that best results are obtained when soluble salts containing an anion from the group of carbonate, borate, arsenite, arsenate, antimonate, molybdate, tungstenate, vanadate and silicate are used to precipitate the metallic cation when the corresponding metal cation-anion salts is slightly soluble or insoluble in water. While I have pointed out in my prior application that fluorides can be used to form fluoride complexes of reverse polarity, it should also be noted that the use of sodium fluoride or potassium fluoride to remove aluminum ion solubilized from the anode can give rise to sodium or potassium cryolite ($Na_3AlF_6$) which is insoluble in the electrophoretic bath, as contrasted with the simple use of ammonium fluoride to produce the reverse-polarity complex $[AlF_6]^{-3}$ which remains in solution as anion. In addition, I have found that organic materials, especially alphahydroxyquinoline, salicylaldoxim, cupferron ($C_6H_5NNOONH_4$) and 2-aminobenzoic acid also will precipitate metal ions.

I prefer to make use of a bath containing 20 to 300 g./l. of the synthetic resin particles (preferably 50 to 150 g./l.), to maintain the bath at a pH of 6 to 13 (preferably 7 to 11) by the addition of ammonia, organic amines and/or aqueous alkaline, and to supply the precipitating additive or complexing agent in an amount between 0.5 and 50 g./l. (preferably 5 to 20 g./l.). The bath temperature may range between 10° and 50° C. and is preferably ambient temperature with suitable cooling to maintain the temperature substantially constant. The electrophoretic potential should range between 10 and 250 volts (preferably 40 to 150 volts) and the current density should lie between 0.01 and 25 a./dm.$^2$ (preferably 1 to 10 a./dm.$^2$) at the inception of coating. The coating time may range between 1 second and 3 minutes with suitable increases within this range as the voltage is decreased and vice versa. The bath may also contain plasticizers, dyestuffs, pigments and surface active agents especially wetting agents, as have been proposed heretofore for electrophoretic coating. After removal from the bath, the coated substrate is washed with water and finally rinsed with distilled and de-ionized water, and dried at a temperature up to 200° C. for a period of 2 to 10 minutes at this temperature. The coatings can be applied on aluminum and other metal substrates as described in my prior application after scouring them in alkaline solutions, with or without electrolytic degreasing and/or with treatment by organic solvents in liquid or vapor phase is such degreasing. Etching may be carried out in acid or alkaline medium.

A second aspect of this invention resides in the neutralization of the metallic cations without precipitating them from solution. I have found that best result are obtained with amino acids and especially glycines, which are capable of complexing the cations and electrically neutralizing them while maintaining them in a solubilized form. The bath conditions and operating modalities are identical to those presented above.

The polymeric materials employed in the dispersion of the bath include polyacrylates, polyvinylidene chloride, polyvinyl chloride, polyvinylesters, polyisobutylenes, polyvinylpropionates, polyvinylacetate, polyvinylalcohol and polyvinylpyridine.

Below, I present several examples illustrative of the present invention and a system described in my prior application. The first set of examples relate to processes for reversing cation polarity according to application Ser. No. 373,970, while the second and third sets relate to precipitation neutralization and soluble neutralization in accordance with the present invention.

POLARITY-REVERSAL METHOD

Example I

An aqueous dispersion of a high-molecular-weight polyacrylate (10–30% solid synthetic-resin particles) has dissolved therein 1.5% by weight ammonium fluoride as a complex former. The substrate and counterelectrode are composed of aluminum and a potential of 10 volts with a current density of 1 amp./dm.$^2$ is applied. The substrate is rendered anodic while the counterelectrode is cathodic; pulsating direct current is employed. With a bath temperature of 15–35° C., a layer of polyacrylate is formed whose density increases with increasing current density and whose thickness is merely a function of the duration of the electrophoresis process. The process is carried out for a period sufficient to deposit in excess of 50% of the polyacrylate particles upon the metal substrate. The adhesion of the polyacrylate is found to be vastly superior to that obtained by other methods of coating the substrate. The $AlF_6^{-3}$ complex ion remains in solution.

Example II

1% by weight potassium cyanide is added to a 10–40%, by weight, dispersion of polymerized vinylidene chloride in water. Substrates and counterelectrodes consisting of copper and zinc are employed at a temperature of 15–35° C.; deposition of almost all of the synthetic-resin particles is obtained with a potential of 8 volts and a current density of 0.8 amps/dm.$^2$.

By proper selection of the synthetic resins, a wide range of physical characteristics of the synthetic-resin layer can be obtained. For instance, with the examples given above it was possible to obtain specific gravities of the layers between substantially 0.8 and 1.12, appearances ranging from transparent through white and brown, and layer characteristics ranging from tacky or adhesive through nontacky, heat-sealable and weldable. The layers were temperature-resistant in the range of −70° to +250° C., and had a resistance to deterioration by light ranging from good to poor, a tear resistance ranging from 6 to 1200 kp./cm.$^2$ and a tear-yield point from 3 to 3800% in excess of conventional coatings.

PRECIPITATION CONCENTRATION METHOD

Example III

A electrophoresis bath is prepared containing, in water, 75 g./l. of finely divided polystyrene/polyacrylonitrile copolymer (in dispersed form), 75 g./l. of acrylic-olymer plasticizer and 5 g./l. of concentrated ammonia solution (ammonium hydroxide) to yield a pH of 9. The bath temperature was ambient room temperature (about 20 to 25° C.) and the substrates were immersed in the bath for a period of 10 seconds prior to application of the electrophoresis potential. A substrate and counterelectrode were formed of the same metal in each case and were treated prior to immersion in the bath in perchloroethylene vapor for degreasing.

The applied potential was 50 volts, the initial current density was 5 a./dm.$^2$ and the coating time was 10–15 seconds.

After each specimen was coated, in the form of a plate of the indicated metal, it was rinsed in a spray of cool water, dipped in distilled water and baked for a period of 10 minutes at a temperature of 200° C. In the Table given below, the quantities of the specified additives provide the indicated type of coating on an aluminum substrate. In each case the coating was uniform, pore-free and strongly adherent. It had either a matte texture or a bright finish as indicated.

TABLE

| Example | Quantity, g./l. | Additive | Appearance of coating |
|---|---|---|---|
| III-A | 5 | Sodium carbonate | Matte. |
| III-B | 10 | ....do | Do. |
| III-C | 5 | Potassium fluoride | Bright. |
| III-D | 10 | ....do | Do. |
| III-E | 5 | Sodium fluoride | Do. |
| III-F | 10 | ....do | Do. |
| III-G | 10 | Sodium tetraborate | Matte. |
| III-H | 10 | Sodium metaarsenite | Do. |
| III-I | 5 | Sodium molybdate.$2H_2O$ | Bright. |
| III-J | 10 | ....do | Do. |
| III-K | 5 | Sodium metavanadate.$4H_2O$. | Matte. |
| III-L | 10 | ....do | Do. |
| III-M | 5 | Sodium orthosilicate.$2H_2O$ | Do. |
| III-N | 5.8 | Sodium metasilicate.$5H_2O$ | Do. |
| III-O | 11.5 | ....do | Do. |

Example IV

Using the bath of Example III but substituting for the aluminum plate thereof various metals including zinc and iron, with organic precipitating additives, the results obtained in the outlined table were achieved:

TABLE

| Example | Metal | Quantity, g./l. | Additive | Characteristic of coating |
|---|---|---|---|---|
| IV-A | Aluminum | 10 | α-Hydroxyquinoline | Light green, thick, bright, hard. |
| IV-B | Zinc | 10 | ....do | Light green, thin, hard. |
| IV-C | Iron | 10 | ....do | Gray, thick, bright. |
| IV-D | ....do | 10 | Salicylaldoxime | Gray, thin, transparent. |
| IV-E | Aluminum | 10 | Cupferron | Yellowish, thin hard. |
| IV-F | Iron | 10 | 2-aminobenzoic acid | Grayish, brown, thin, bright, hard. |

SOLUBLE NEUTRALIZATION METHODS

Example V

Using the bath of Example III but 10 g./l. of glycine as the additive, aluminum was coated with the polystyrene/polyacrylonitrile layer. In this case no precipitate was formed but the aluminum ions released from the anode were tied up as neutral complexes with the glycine. The coating layer was yellowish, thin and hard.

I claim:

1. A process for depositing a synthetic resin upon a metallic substrate anodically soluble in aqueous solution, comprising the steps of:

forming a dispersion of particles of said synthetic resin in an aqueous medium with acquisition of a negative polarity by said particles;

rendering said substrate anodic in said medium to deposit said synthetic resin particles electrophoretically on said substrate while releasing metal ions from a surface of said substrate into solution in said medium; and preventing precipitation of said particles by interaction with said metal ions by forming electrically neutral compounds of said metal ions in said medium by introducing into said medium at least one soluble additive capable of forming slightly soluble salts with said metal ions and selected from the group which consists of carbonates, fluorides, borates, arsenites, arsenates, antimonates, tungstenates, vanadates, silicates, hydroxyquinoline, salicylaldoxime, cupferron, and 2-aminobenzoic acid.

2. The process defined in claim 1 wherein said synthetic resin is selected from the group which consists of polyacrylates, polyvinylidene chloride, polyvinyl chloride, polyvinylesters, polyisobutylenes, polyvinylpropionates, polyvinylacetate, polyvinylalcohol, and polyvinylpyridine.

3. The process defined in claim 1 wherein said aqueous medium is at a pH ranging between 6 and 13, said synthetic resin is present in said medium in an amount ranging between 20 and 300 g./l., the temperature of said medium upon deposition of said particules upon said substrate ranges between 10 and 50° C., said substrate is subjected to electrophoretic deposition of said particles thereon at a current density of 0.01 to 25 a./dm.$^2$ for a period of 1 sec. to 3 min.

4. A process for depositing a synthetic resin upon a metallic substrate anodically soluble in aqueous solution, comprising the steps of:

forming a dispersion of particles of said synthetic resin in an aqueous medium with acquisition of a negative polarity by said particles;

rendering said substrate anodic in said medium to deposit said synthetic resin particles electrophoretically on said substrate while releasing metal ions from a surface of said substrate into solution in said medium; and preventing precipitation of said particles by interaction with said metal ions by forming electrically neutral compounds of said metal ions in said medium, the interaction of said particles with said metal ions being prevented by introducing into said medium an amino acid capable of forming an electrically neutral compound with said metal ions remaining soluble in the medium.

5. The process defined in claim 4 wherein said amino acid is glycine.

6. A process for depositing a synthetic resin upon a metallic substrate anodically soluble in aqueous solution, comprising the steps of:

forming a dispersion of particles of said synthetic resin in an aqueous medium with acquisition of a negative polarity by said particles;

rendering said substrate anodic in said medium to deposit said synthetic-resin particles electrophoretically on said substrate while releasing metal ions from a surface of said substrate into solution in said medium; and preventing precipitation of said particles by interaction with said metal ions by forming electrically neutral compounds of said metal ions in said medium, the interaction of said particles which said metal ions being prevented by introducing into said medium an additive capable of forming an electrically neutral compound with said metal ions remaining soluble in the medium.

7. The process defined in claim 6 wherein said additive is an amino acid.

8. The process defined in claim 6 wherein precipitation of said particles is prevented by introducing into said medium 0.5 to 50 g./l. of an additive selected from the group which consists of compounds capable of forming slightly soluble salts with said metal ions and compounds capable of complexing said metal ions to form electrically neutral species remaining in solution.

9. The process defined in claim 8 wherein said additive is present in said medium in an amount ranging between 5 and 20 g./l., said medium has a pH of 7 to 11, the synthetic resin is present in said medium in an amount ranging between 50 and 150 g./l., said substrate is coated with said synthetic resin at a potential of 10 to 250 volts and a current density of 1 to 10 a./dm.$^2$ and at approximately room temperature.

10. The process defined in claim 8, further comprising the step of baking said layer onto said substrate at a temperature above the softening point of said resin but below about 200° C.

References Cited

UNITED STATES PATENTS 3,364,162    1/1968    Huggard _____ 204—181

OTHER REFERENCES

Fink, Transactions of the Electrochemical Society, vol. 94 (1948), pp. 309, 317, 321 and 340.

HOWARD S. WILLIAMS, Primary Examiner